T. D. Little.
Rake.
N° 76,477. Patented Apr. 7, 1868.
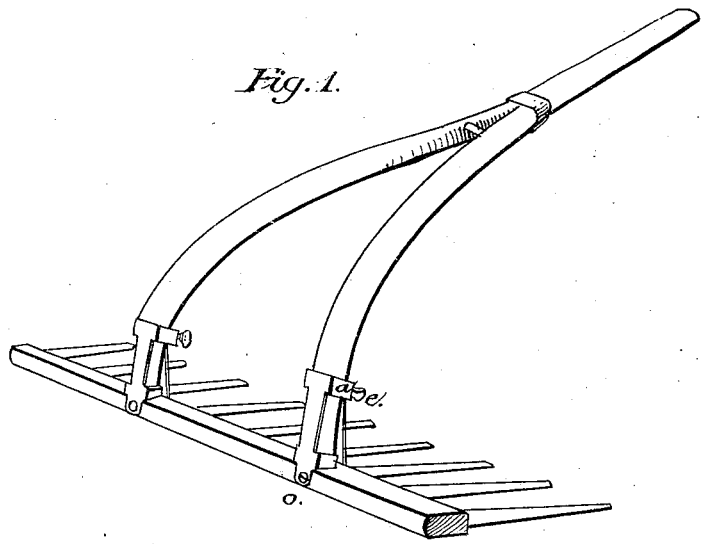
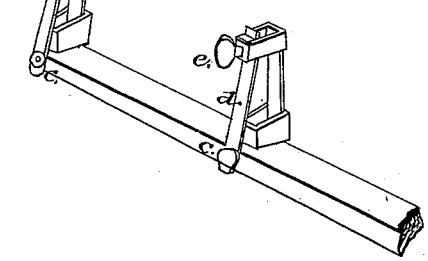
WITNESSES:
C. F. Brown
Walter E. Stumph
INVENTOR:
Thomas D. Little
per
Geo. E. Brown
Atty.

United States Patent Office.

THOMAS D. LITTLE, OF SALISBURY, NEW HAMPSHIRE.

Letters Patent No. 76,477, dated April 7, 1868.

IMPROVEMENT IN ATTACHMENT FOR HEADS OF RAKES.

*The Schedule referred to in these Letters Patent and making part of the same.*

TO ALL WHOM IT MAY CONCERN:

Be it known that I, THOMAS D. LITTLE, of Salisbury, in the county of Merrimack, and State of New Hampshire, have invented a new and improved Adjustable Attachment for Rake-Heads for Drag-Rakes; and I do hereby declare that the following is a full and exact description thereof, reference being had to the accompanying drawings, and the letters of reference marked thereon.

The nature of my invention consists in attaching the handles of drag-rakes to the head in such a manner that said handle may be detached at pleasure for convenience in carrying, and also in such a manner that the teeth of the rake may be adjusted at any angle with said handle that may be convenient for the person using the same.

To enable others skilled in the art to make and use my invention, I will proceed to describe the same and its mode of operation.

I construct the socket $a$ of cast iron, having apertures for the reception of the handle, as shown in the drawings, and having the lip $b$, and through the said lip $b$, and through the rake-head, I pass a bolt, securing the same by the nut $c$. Said bolt also passes through the brace or spring $d$, which brace passes through the upper ring or clasp of my socket. To said upper ring or clasp I attach the thumb-screw $e$, which works upon the upper end of said brace.

I insert my handle, as shown in the drawings, and confine the same in place by turning the thumb-screw $e$. It will be seen that I apply a socket constructed and attached, as above described, to each branch of my rake-handle. The handle may be removed at pleasure by loosening the thumb-screw $e$.

When handles of drag-rakes are fixed permanently to the head, in the usual mode of construction, an inconvenience in using often arises for the reason that the angle of the teeth with the handle, or line of draught, which may be convenient for a tall man, is inconvenient for a short man.

It will be seen that the teeth of my rake may be adjusted at such an angle with the line of draught as may be convenient for the person using the same, by slightly loosening the nut $c$, which will allow the socket to be elevated or depressed, and when the handle is inserted, it may be confined at the proper elevation by placing it in the proper position, and turning in the thumb-screws, so as to hold the same firmly in the desired position.

It will also be seen that by removing the handle, as explained, my rake may be packed in a much smaller compass for transportation than is possible in case the handle is permanently fixed.

What I claim as my invention, is—

The adjustable attachment for heads of drag-rakes composed of the socket $a$, brace $d$, bolt and nut $b$, and thumb-screws $e$, combined, constructed, and applied, as above described.

THOMAS D. LITTLE.

Witnesses:
  ISAAC A. HILL,
  EUGENE F. SARY.